United States Patent
Adzhigirey et al.

(10) Patent No.: US 9,910,499 B2
(45) Date of Patent: Mar. 6, 2018

(54) SYSTEM AND METHOD FOR DETECTING THREE DIMENSIONAL GESTURES TO INITIATE AND COMPLETE THE TRANSFER OF APPLICATION DATA BETWEEN NETWORKED DEVICES

(71) Applicant: Samsung Electronics Co. Ltd., Suwon-si, Gyeonggi-do (KR)

(72) Inventors: Ivan B Adzhigirey, Overland Park, KS (US); Luke Russell Harvey, Edgerton, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/739,934

(22) Filed: Jan. 11, 2013

(65) Prior Publication Data
US 2014/0198024 A1    Jul. 17, 2014

(51) Int. Cl.
*G06F 3/01* (2006.01)
*G06F 3/0481* (2013.01)

(52) U.S. Cl.
CPC .......... *G06F 3/017* (2013.01); *G06F 3/04815* (2013.01)

(58) Field of Classification Search
CPC ....... G06F 3/04883; G06F 2203/04101; G06F 2203/04108; G06F 2203/04808; G06F 3/017
USPC .......................................... 345/173; 715/863
See application file for complete search history.

(56) References Cited

U.S. PATENT DOCUMENTS

| | | | |
|---|---|---|---|
| 2002/0120728 A1 | 8/2002 | Braatz et al. | |
| 2007/0146347 A1 | 6/2007 | Rosenberg | |
| 2008/0059578 A1* | 3/2008 | Albertson | G06F 3/016 709/204 |
| 2009/0327977 A1 | 12/2009 | Bachfischer et al. | |
| 2010/0095206 A1 | 4/2010 | Kim | |
| 2011/0081923 A1* | 4/2011 | Forutanpour et al. | 715/780 |
| 2011/0175822 A1 | 7/2011 | Poon et al. | |
| 2012/0038550 A1* | 2/2012 | Lemmey et al. | 345/156 |
| 2012/0144073 A1 | 6/2012 | Smith et al. | |

(Continued)

FOREIGN PATENT DOCUMENTS

| | | |
|---|---|---|
| CN | 102387131 A | 3/2012 |
| WO | 2012/099584 A1 | 7/2012 |

OTHER PUBLICATIONS

WO 2013/077883. Inventor: Anderson, Tile: Gesture Input with Multiple Views, Displays and Physics. Date: Nov. 23, 2011. pp. 45.*

*Primary Examiner* — Kevin M Nguyen
(74) *Attorney, Agent, or Firm* — Jefferson IP Law, LLP

(57) ABSTRACT

An apparatus and method for detecting a three-dimensional gesture are provided. The method includes detecting, by at least one three dimensional motion sensing input device embedded in a network having a plurality of interconnected hardware, a three-dimensional gesture of a user, selecting, based on the detected gesture, application data corresponding to an application being executed, stored or displayed on a first device in the network to be transmitted to a second device in the network, transmitting the selected application data to hardware and software associated with the second device, and performing at least one of executing, storing or displaying the selected application data on the second device, wherein the at least one three dimensional motion sensing input device comprises gesture detection hardware and software.

16 Claims, 7 Drawing Sheets

(56) References Cited

U.S. PATENT DOCUMENTS

| | | | |
|---|---|---|---|
| 2012/0198353 A1 | 8/2012 | Lee et al. | |
| 2012/0296979 A1 | 11/2012 | Iwai et al. | |
| 2013/0219278 A1* | 8/2013 | Rosenberg | G06F 3/017 715/733 |
| 2013/0278499 A1* | 10/2013 | Anderson | G06F 3/01 345/156 |
| 2013/0296057 A1* | 11/2013 | Gagner | G06F 3/017 463/37 |
| 2014/0188989 A1* | 7/2014 | Stekkelpak | H04L 67/02 709/204 |

* cited by examiner

US 9,910,499 B2

SYSTEM AND METHOD FOR DETECTING THREE DIMENSIONAL GESTURES TO INITIATE AND COMPLETE THE TRANSFER OF APPLICATION DATA BETWEEN NETWORKED DEVICES

BACKGROUND OF THE INVENTION

1. Field of the Invention

The present invention relates to a system for detecting gestures to initiate the transfer of data between devices and a method of controlling the same. More particularly, the present invention relates to an apparatus and method for detecting three-dimensional gestures to initiate and complete the transfer of application data between networked devices.

2. Description of the Related Art

Mobile devices are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile devices are often incorporated into various types of computer and communications networks. Conventional networks are, for example, known as a collection of hardware devices interconnected by communication channels that allow sharing of resources and information. In conventional networks, a process in one device is generally able to send and receive data to and from at least one process or piece of hardware residing in a remote device. Several types of networks exist, and can be classified based upon any of the medium used to transport the data, the communications protocol being used, the scale or scope of the network, and the like.

Types of networks may include any of a Local Area Network (LAN), a Metropolitan Area Network (MAN), a Wide Area Network (WAN), a Global Area Network (GAN), workgroup networks, client-server networks, an Intranet, an Extranet, and the like.

At present, a system and method exists for initiating file transfer between two devices with touch based interfaces. However, this approach requires the transmitting device to be physically touched. A second disadvantage of this method is that only files can be transferred; applications in various states of operation, like open windows and other application states involving volatile memory, are not considered.

FIGS. 1A and 1B are diagrams illustrating a method for initiating file transfer between two devices with touch based interfaces according to the related art.

Referring to FIGS. 1A and 1B, illustrations depict the beginning and end images of a flick gesture on a touch screen 100 of a mobile device. FIG. 1A illustrates the touch screen 100 whereupon a user's finger 110 touches the display to engage a graphical element 120 that is associated with a particular data file. The user 110 points the display in the direction of a target device to which the user 110 wishes to transfer the file. The target device is assumed to be just off the pointing edge 140 of the touch screen 100. The user's finger 110 then performs a flick gesture in which the finger is quickly dragged as shown in FIG. 1B. The user's finger 110 remains in contact with the touch screen display 100 throughout the flick gesture.

Additionally known are systems in which predefined gestures are used to provide an intuitive way to transfer objects between multi-touch devices. In these systems, a first gesture, such as a pinching motion, is used to select an object to transfer from a source device. A second gesture, such as a de-pinching gesture, is used to designate a destination for the object on a second device. Data associated with the initiator of the transfer, such as data representative of a fingerprint scan, may be employed to match the source device with the destination device. However, this approach also requires a device to be physically touched to initiate a file transfer.

FIG. 2 is a flow diagram illustrating a method in which predefined gestures are used to transfer objects between multi-touch devices according to the related art.

Referring to FIG. 2, a flow diagram illustrates a process 200 whereby a user employs a source multi-touch device for transferring an object. At step 210, the device detects a predefined gesture on its surface. At step 220, a location on the user interface is determined from the predefined gesture. At step 230, the user is identified. This may occur, for example, by identifying the user's fingerprint while the use touches the device. At step 240, a broadcast signal is received from a potential destination device. At step 250, user data is sent to the potential destination device. At step 260, a signal is received from the destination device requesting the object. At step 270, the object is transferred.

Also known are methods of making various modifications to graphic objects on a single device based on three-dimensional motion. However, the disadvantages of this method include that it is limited to object manipulation on a single device, and that is does not involve the transfer of application data or application state information to multiple devices.

FIG. 3 is a diagram illustrating a method of making modifications to graphic objects on a single device based on three-dimensional motion according to the related art.

Referring to FIG. 3, a user that sets an edit region 320 on a touch screen 310 of a mobile terminal 300 by drawing a closed curve by dragging, e.g., a finger on the touch screen 310. After setting the edit region 320, if the user pinches positions corresponding to the vertical upper region of the boundary of the edit region 320 with two fingers, without touching the touch screen 310, a 3D proximity sensor 330 of the mobile terminal 300 recognizes the gesture and the controller recognizes that the edit region 320 is pinched. After that, if the user moves the finger in a horizontal direction of the touch screen 310, the edit region 320 may expand in a horizontal direction of the touch screen 310. A disadvantage of this method is that it is limited to a single device, and does not involve the transfer of data to other devices.

At present, no technique exists for allowing a user to more conveniently transfer applications and related data between devices by using gestures.

Accordingly, there is a need for a system and method which uses three dimensional gestures to transfer applications and related data between devices. In particular, there is a need for a more intuitive system and method for initiating and completing the transfer of application data across networked devices by detecting and recognizing common or predefined gestures in a three dimensional space.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for detecting three-dimensional gestures to initiate and complete the transfer of application data between networked devices.

In accordance with an aspect of the present invention, a method for detecting a three-dimensional gesture is provided. The method includes detecting, by at least one three dimensional motion sensing input device embedded in a network having a plurality of interconnected hardware, a three-dimensional gesture of a user, selecting, based on the detected gesture, application data corresponding to an application being executed, stored or displayed on a first device in the network to be transmitted to a second device in the network, transmitting the selected application data to hardware and software associated with the second device, and performing at least one of executing, storing or displaying the selected application data on the second device, wherein the at least one three dimensional motion sensing input device comprises gesture detection hardware and software.

In accordance with another aspect of the present invention, a network is provided. The network includes a plurality of interconnected hardware, a three-dimensional motion sensing input device including gesture detection hardware and software for detecting a three-dimensional gesture, a selecting unit for selecting, based on a detected gesture, application data corresponding to an application being executed, stored or displayed on a first device in the network to be transmitted to a second device in the network, and a transmitting unit for transmitting the selected application data to hardware and software associated with the second device, wherein at least one piece of the interconnected hardware performs at least one of executing, storing or displaying the selected application data on the second device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figures 1A, 1B:
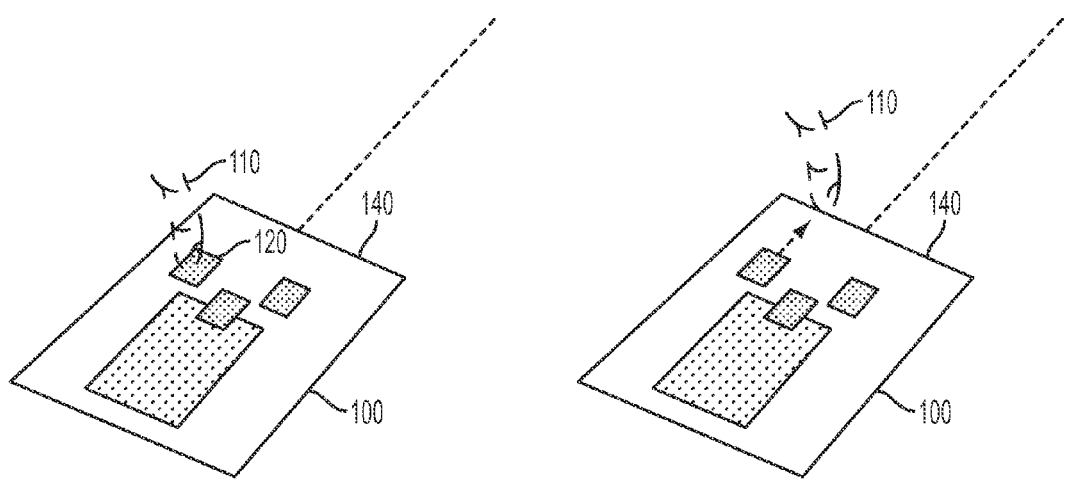
FIGS. 1A and 1B are diagrams illustrating a method for initiating file transfer between two devices with touch based interfaces according to the related art.
Figure 2:
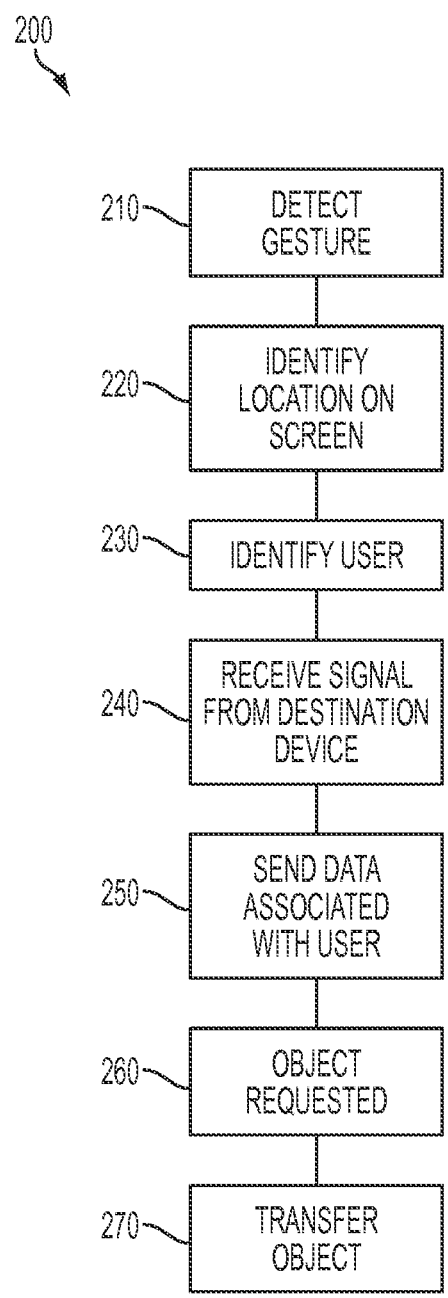
FIG. 2 is a flow diagram illustrating a method in which predefined gestures are used to transfer objects between multi-touch devices according to the related art.
Figure 3:
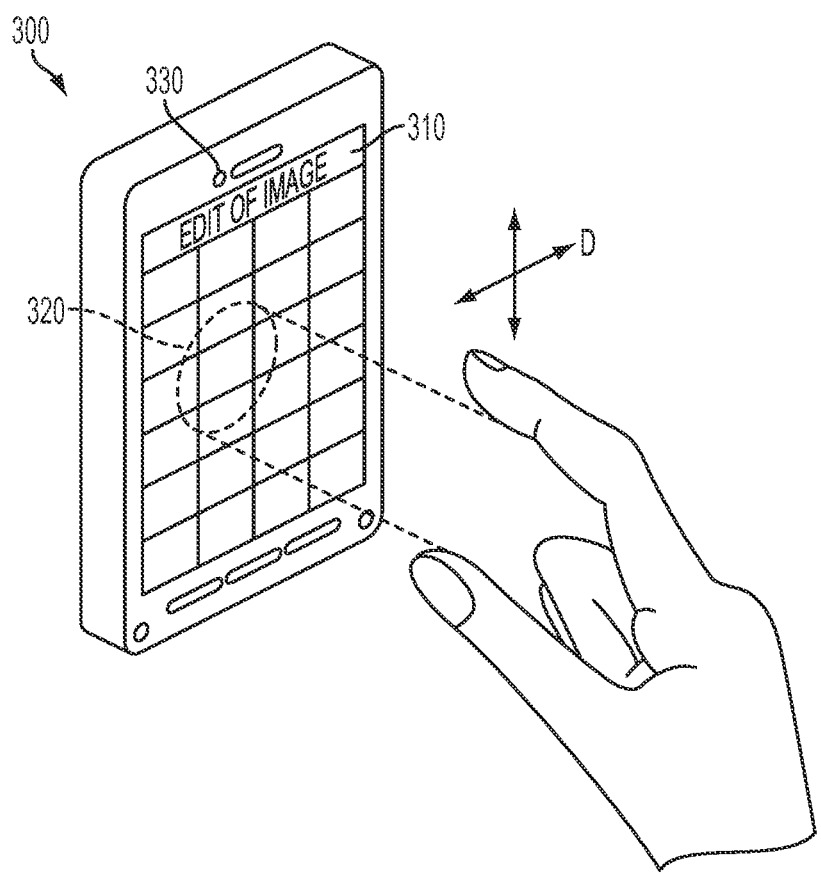
FIG. 3 is a diagram illustrating a method of making modifications to graphic objects on a single device based on three-dimensional motion according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include a system and method for the detection of three dimensional gestures to initiate and complete the transfer of application data between networked devices. The application data can be, for example, non-volatile data stored on a file system and/or volatile data, such as data relating to the state of an application stored in memory and/or in a video, audio or other buffer. The application data is not limited herein, and may correspond to an application being executed, stored or displayed on one or more pieces of interconnected hardware within the network. For example, a user may be interacting with a software application that is currently running in a window and being displayed on the display of a first stationary device or a first mobile device in a network, and wish to transfer or duplicate the imagery and/or the related application data associated with that which is being displayed on the first device to a second device in the network. That is, the user may, for example, make a pre-defined or intuitive gesture in a space that has a predefined position relative to and within a predefined distance from the display of the first device which is detected by a three-dimensional detection sensor incorporated into the system. The three-dimensional detection sensor may interpret the gesture as indicating a selection of the open program or application (or window thereof) being displayed on the display of the first device. The user makes another predefined or intuitive gesture within a space having a predefined position relative to and within a predefined distance from the display (or other designated feature) of the first or the second device. This gesture identifies the desired second (target) device and completes the transfer or duplication of the selected imagery and/or the related application data from the first device to the desired second device and may be displayed thereon.

Figure 4:
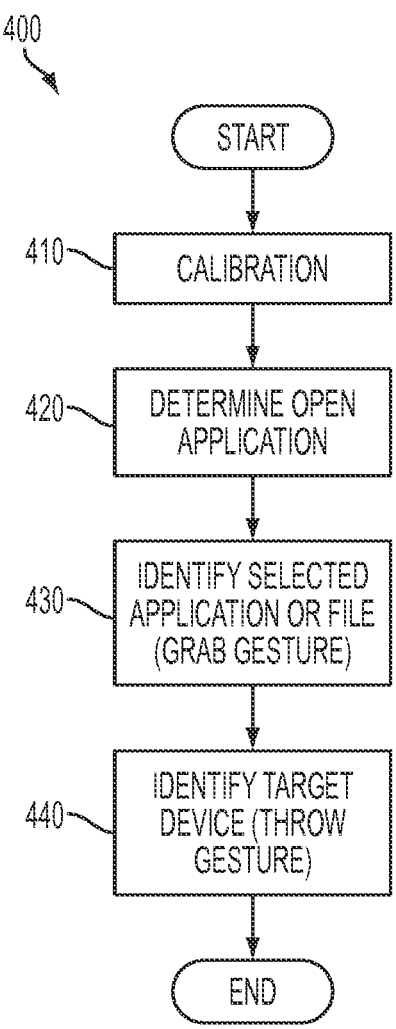
FIG. 4 is a flow diagram describing the detecting of three dimensional gestures to initiate and complete the transfer of application data between networked devices according to an exemplary embodiment of the present invention.

FIG. 4 is a flow diagram describing the detecting of three dimensional gestures to initiate and complete the transfer of application data between networked devices according to an exemplary embodiment of the present invention.

Referring to FIG. 4, the process 400 of an exemplary embodiment of the present invention is described in which, at step 410, a user may first calibrate the network so that it can accurately identify and recognize the user's gestures or to extrapolate the direction, orientation, distance, or the like, of network components and/or devices relative to one another and/or relative to the user. In some instances, calibration may not be necessary. For example, the user may decide to use predefined gestures that the system is already capable of recognizing, or the user may use predefined settings in which calibration information from a previous calibration is retrieved and used.

At step 420, the user may open an application, or determine the existence of an open application or other data being displayed on a first device. The application or other data is not limited herein, and can be, for example, non-volatile data stored on a file system and/or volatile data, such as data relating to the state of an application stored in memory and/or in a video, audio or other buffer. The application data may correspond to an application being executed, stored or displayed on one or more pieces of interconnected hardware within the network. For example, the user may open a software application, or select an open software application that is currently running, in a window and being displayed on the display of a first device. Alternatively, a user may select an icon relating to an application and its associated data and files. The types of applications and related data or files to be identified and selected are not limited herein.

At step 430, the user performs a first gesture in order to select, and in order for the system to identify, the desired application data or files which the user wishes to select and to initiate the transfer of the selected data or files to be transferred or duplicated to the target device. At step 440, the user performs a second gesture in order to identify the desired second (target) device and to complete the transfer or duplication of the selected imagery and/or the related application data from the first device to the desired second device.

Figure 5:
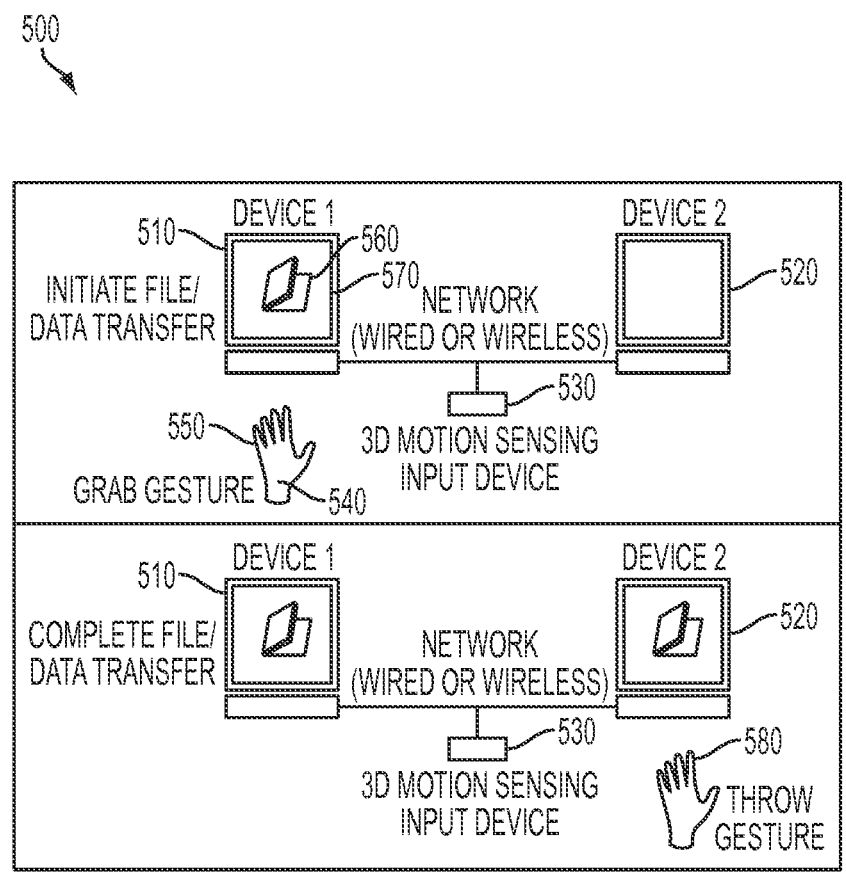
FIG. 5 is a diagram illustrating the detection of three dimensional gestures to initiate and complete the transfer of application data between networked devices according to exemplary embodiments of the present invention.

FIG. 5 is a diagram illustrating the detection of three dimensional gestures to initiate and complete the transfer of application data between networked devices according to exemplary embodiments of the present invention.

Referring to FIG. 5, there is illustrated a computer network 500. Within the network are a first device and a second device, respectively represented by Device 1 510 and Device 2 520, along with a three dimensional motion sensing input device 530. A user 540 positioned in a predefined space relative to a designated network component performs a first gesture 550 that indicates a selection of an application 560 displayed on the display 570 of Device 1 512. The three dimensional motion sensing input device 530 detects the gesture and indicates on display 560 the item selected. The user 540 the performs a second gesture 580 within a predefined time period from the point in time in which the first gesture 540 was performed, and within a space having a predefined position relative to and within a predefined distance from the display 570 (or other designated feature) of the device(s). The detected gesture identifies the desired target device (Device 2) 520 and initiates the transfer or duplication of the selected imagery and/or the related application data 560 from Device 1 510 to Device 2 520, and may be displayed thereon.

Device 1 510 and Device 2 520 may each be any of a mobile terminal, a personal computing device, a media player, a television, a stereo, a digital picture frame and/or any other device that is configured to be within the network and to transfer, and accept the transfer of, applications and data files in the relevant format.

The three dimensional motion sensing input device 530 may be a commercially available three dimensional motion sensing input device 530, such as the three dimensional motion sensing Universal Serial Bus (USB) accessory offered by Leap Motion designed to allow a user to control a personal computer using simple hand and finger gestures. A further suitable and commercially available movement and gesture recognition device is the Kinect by Microsoft.

In exemplary embodiments of the present invention, the first gesture and the second gesture are not limited, and may each be any gesture, such as a predefined gesture or an intuitive gesture. A gesture that is a predefined gesture may or may not be an intuitive gesture and vice-versa. In exemplary embodiments, suitable gestures may or may not be arbitrary.

In exemplary embodiments, the first gesture and the second gesture may be a grabbing gesture or a throwing gesture. The grabbing gesture may be any predetermined or intuitive gesture for grabbing an object, such as a fist clenching gesture. Likewise, the throwing gesture may be any predetermined or intuitive gesture for throwing an object, such as an overhand motion that begins with a user's arm being bent and the user's fist as being in a clenched posture, and that ends with the user's arm being extended toward Device 2 and with the hand of the user in an open posture.

However, suitable gestures of exemplary embodiments are not limited, and may also be, e.g., any of a pinching gesture, a poking gesture, a tapping gesture, a circling gesture, picking gesture, grasping gesture, or any other gesture which connotes or is intended to cause the selection and/or transmission of an item, a file, or an application and/or related data that is being executed, stored or displayed on a device. Likewise, suitable gestures may be, e.g., any of a backhanded throwing or striking gesture, a punching gesture, a tossing gesture, a spritzing gesture, a flipping gesture, or any other gesture which connotes or is intended to cause the selection and/or transmission of an item, a file, or an application and/or related data that is being displayed on or that is installed on a device. Various other suitable gestures include, e.g., a swiping gesture, a circling gesture, a sign language gesture or any other gesture.

In exemplary embodiments of the present invention, the first gesture and the second gesture may be performed in a direction that has any designated orientation relative to any network component, including any virtual component or cloud resource. For example, the first gesture and the second gesture may be performed in a direction that is orthogonal to, or substantially orthogonal to, any of Device 1, Device 2, or the three dimensional motion sensing input device. Additionally, the first gesture and the second gesture may be performed in a direction that is perpendicular to, or that is in any other directional orientation relative to, any network component such as Device 1, Device 2, or the three dimensional motion sensing input device. The first gesture and the second gesture may also be performed in a designated direction that is not related to the position of any network device.

The three dimensional motion sensing input device of exemplary embodiments of the present invention may be any conventional three dimensional motion sensing input device capable of detecting an intuitive or a predefined gesture of a user and that is capable of recognizing the gesture as being, for example, a selecting gesture, a grabbing gesture, a throwing gesture, or the like. Examples of suitable three dimension sensing input devices currently in available are the Microsoft Kinect and the Leap Motion three dimensional input sensing devices.

In exemplary embodiments of the present invention, the three dimensional motion sensing input device may be incorporated into another network component, such as a mobile device or a personal computer, or may be a stand-alone device in the network, such as a wall-mounted, desktop or free-standing device. Additionally, the network may comprise more than one three dimensional motion sensing input device. Each three dimensional motion sensing input device may have its own designated detection area, or may be configured to detect the same gesture as one or more other three dimensional motion sensing input devices. Additionally, the three dimensional motion sensing input device may be any suitable distance from, and may have any orientation to, a user, a user's gesture, or to any network component, including any virtual component or cloud resource. A suitable distance may include a small distance, such as millimeters, or a large distance, such as any distance over which the three dimensional motion sensing input device remains capable of accurately obtaining sufficient gesture information. A suitable orientation may include any orientation, such as an orthogonal orientation, a perpendicular orientation, an aerial orientation, or any other orientation.

In exemplary embodiments of the present invention, the three dimensional motion sensing input device may be configured to recognize a gesture that is a multi-part gesture or a gesture that is partially delayed in time. For example, the three dimensional motion sensing input device may recognize a grab and throw gesture even when the grab gesture is performed some time prior to, and separate in time from, the throw gesture.

In exemplary embodiments, the system may be calibrated prior to use in order for the system to be capable of accurately detecting a particular gesture or a particular user. System calibration may also aid the system in extrapolating the orientation, distance and/or direction of network devices and components from one another and/or the user.

Figure 6:
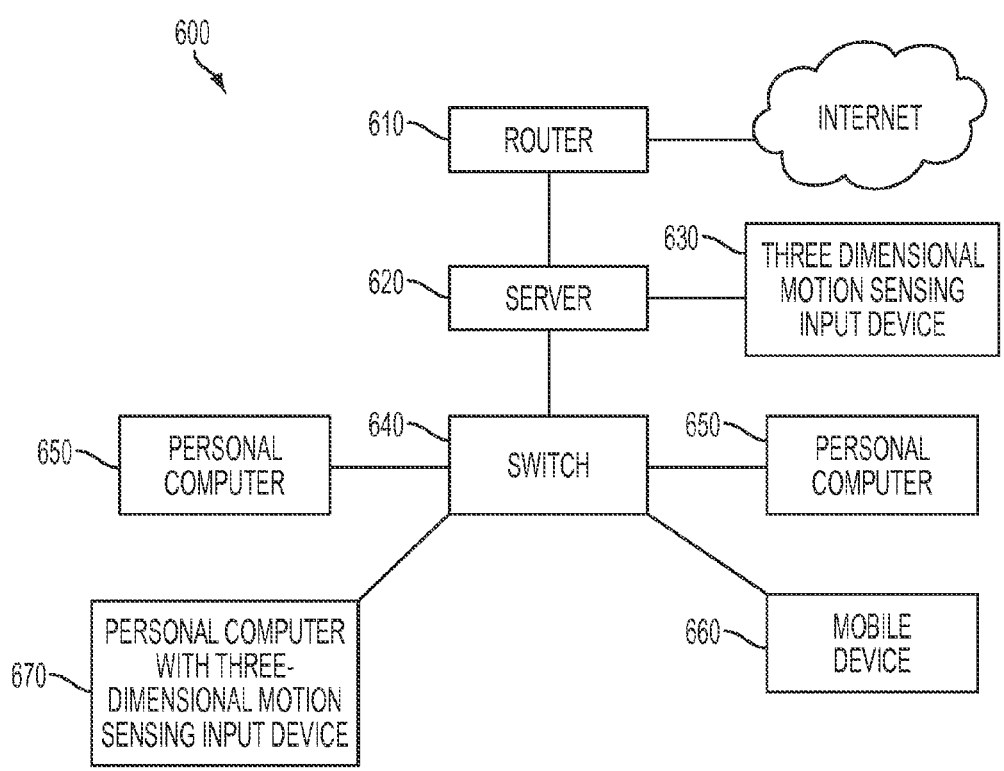
FIG. 6 is a block diagram schematically illustrating a configuration of a communications network according to an exemplary embodiment of the present invention.

FIG. 6 is a block diagram schematically illustrating a configuration of a communications network according to an exemplary embodiment of the present invention.

Referring to FIG. 6, a communications network 600 is shown according to an exemplary embodiment of the present invention. The network consists of a router 610, a server 620, a stand-alone three dimensional motion sensing input device 630, a switch 640, personal computers 650, a mobile device 660 and a personal computer that includes a three dimensional motion sensing input device 670.

The router 610 is a conventional router that connects the network 600 to the internet. The server 620 may be a conventional Local Area Network (LAN) server, e.g., having one or more processors, RAM, and storage means, such as an array of hard disks. The processing capacity and memory of the server are configured to run several applications concurrently. The stand-alone three dimensional motion sensing detection unit 630 may be any commercially available three dimensional motion sensing detection unit. The switch 640 may be a conventional switch and serve as a controller to enable the networked devices to communicate efficiently, share and allocate resources. Personal computer 650 and mobile device 660 may each be, e.g., any type of handheld, tablet, desktop, or other communications or computing device, many of which are widely available and well known in the art. Personal computer 670 may bodily incorporate any commercially available three dimensional motion sensing detection unit. The three dimensional motion sensing detection unit may be the same as, or different than the stand alone three dimensional motion sensing detection unit 650.

The network of the present invention is not limited to the exemplary embodiments described herein and may include, for example, any architecture and related computational infrastructure such that a target device may be selected from among a plurality of possible target devices by a user of a first device. In exemplary embodiments, the network is aware of the relative position of each networked device. Therefore, once selected, a desired data file may be transmitted from the first device over the network to the target device. Thus, it must be assumed that certain hardware and software are included in exemplary embodiments of the present invention, e.g., hardware and software such that a target electronic device within the networked environment may be identified and selected by the user wishing to transfer application data to the second device from the first device, and hardware and software such that data can be communicated from the first device to the selected second device. A variety of architectures may be suitable and are known in the art. For example, each of U.S. Patent Application Publication Nos. 2006/0241864 and 2006/0256008 describe related system architecture, elements of which may variously and optionally be included herein.

In exemplary embodiments, the number of network components and devices is not limited. For example, the network may include a plurality of components and devices in addition to those shown in FIG. 6, and that may be within the local environment of the user or that may not be within the local environment of the user. Additional devices and components of the network may be any of a mobile terminal, a personal computing device, a network server or printer, a media player, a television, a stereo, a digital picture frame and/or any other device that is configured to be within the network and to accept the transfer of applications and data files in the relevant format from the first device.

In exemplary embodiments of the present invention, the first device may be within a predefined distance and/or at a predefined position relative to the target device for the transfer of application data or files to occur. Additionally, the selection of the second device may be made by the user or by network components based at least in part upon which device is in closest proximity to the first device, which device meets the processing, storage or other requirements of the applications or data being transferred, or the like.

Hence, a variety of means may be available for allowing or aiding the user of a network component or device (e.g., a mobile terminal) to select a most preferable target appliance.

Types of networks considered suitable in the present invention are not limited to the exemplary embodiments described herein, and may include any of a Local Area Network (LAN), a Metropolitan Area Network (MAN), a Wide Area Network (WAN), a Global Area Network (GAN), a Personal Area Network (PAN), workgroup networks, client-server networks, an Intranet, an Extranet and the like. A LAN may be a small computer network usually set up within a single building. A MAN may be a network that covers a metropolitan or a municipality area. A WAN may be a network which covers a large geographical area, such as a country or a continent. A PAN may be a network for a single person. A Global Area Network (GAN) may be a network with global coverage. Workgroup networks may include a set of desktop computers that can interconnect with each other without a specific weight on a particular computer or piece of hardware. Any of the aforementioned networks may also use a combination of different technologies, such as satellite communications, Bluetooth, Wi-Fi, Wireless Broadband (Wi-Bro), and the like.

Figure 7:
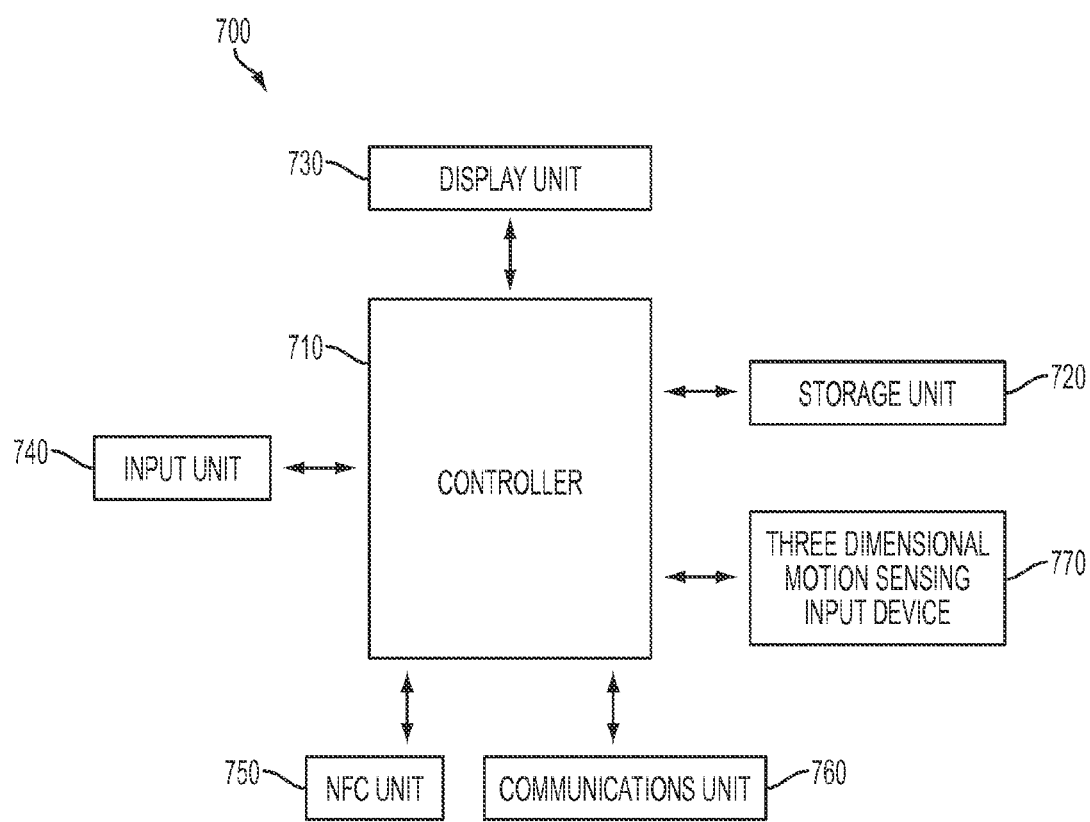
FIG. 7 is a block diagram schematically illustrating a configuration of a mobile terminal according to an exemplary embodiment of the present invention.

FIG. 7 is a block diagram schematically illustrating a configuration of a mobile terminal according to an exemplary embodiment of the present invention.

Referring to FIG. 7, the mobile terminal 700 includes a controller 710, a storage unit 720, a display unit 730, an input unit 740, a Near Field Communications (NFC) unit 750, a communication unit 760 and a three dimensional motion sensing input device 770.

According to exemplary embodiments of the present invention, the mobile terminal 700 may be configured to transfer data to at least one device (e.g., a mobile terminal) over the network of FIG. 6. According to exemplary embodiments of the present invention, the mobile terminal 700 may be configured to select (e.g., enable a user to select) data to transfer to the other device. For example, the mobile terminal 700 may be configured to identify and copy data to transfer to a clipboard that aggregates data for transfer and associates each of the data (e.g., each of the items) with a device authorized to paste or download the data. According to exemplary embodiments of the present invention, the mobile terminal 700 may be configured to communicate with at least one server (e.g., a cloud-based server) so as to transfer the data to the target device via the server (e.g., via the cloud). The mobile terminal 700 may be assigned an identifier from the at least one server upon registration of the mobile terminal 700 with the server. The identifier associated with the mobile terminal 700 may be used by other devices to locate the address of the mobile terminal 700 or to locate on the server data that has been uploaded by the mobile terminal 700.

The storage unit 720 can store user data, and the like, as well as a program which performs operating functions according to an exemplary embodiment of the present invention. For example, the storage unit 720 may store a program for controlling general operation of a mobile terminal 700, an Operating System (OS) which boots the mobile terminal 700, and an application program for performing other optional functions such as a camera function, a sound replay function, an image or video replay function, a NFC function, a three dimensional motion sensing input device 770, and the like.

Further, the storage unit 720 may store user data generated according to a user of the mobile terminal, such as, for example, a text message, a game file, a music file, a movie file, and the like. In particular, the storage unit 720 according to exemplary embodiments of the present invention may store a table which stores a mapping of data that may be transferred with devices to which the data may be transferred. For example, the storage unit 720 may store associations between at least one data item and a device to which the data may be transferred or which may request transfer thereof.

The NFC unit 750 may be configured for communicating with another device via NFC. According to exemplary embodiments of the present invention, the NFC unit 750 may be configured to automatically pair with another device. For example, the NFC unit 750 may pair the mobile terminal 700 with another NFC enabled device when the mobile terminal 700 is brought into close proximity with the other NFC-enabled device. The NFC unit 750 communicates connection data with the other NFC-enabled device during the pairing process. The NFC pairing may be used separate from or in connection with the network of FIG. 6 to communicate connection information between devices known to each other. According to exemplary embodiments of the present invention, the NFC unit 750 may transfer some data such as, for example, metadata to the recipient mobile terminal before the recipient mobile terminal confirms the transfer of the data. Data that may be transferred before the recipient mobile terminal confirms the transfer of data may include, for example, a file name, a first few words of text, file or data size, the originating device name, and the like.

The communication unit 760 is configured for communicating with other devices. For example, the communication unit 760 may be configured to communicate via the network of FIG. 6. According to exemplary embodiments of the present invention, after the mobile terminal 700 is registered or recognized in the network, mobile terminal 700 may transfer data to another device over the network via the communication unit 760. According to exemplary embodiments of the present invention, the communication unit 760 may transfer some data such as, for example, application data, metadata or other data to a second (target) network component or device before the second (target) network component or device confirms the transfer of the data. Data that may be transferred before the second (target) network component or device confirms the transfer of data may include, for example, a file name, a first few words of text, file or data size, the originating device name, and the like.

The input unit 740 may include input keys and function keys for receiving user input. For example, the input unit 740 may include input keys and function keys for receiving an input of numbers or various sets of letter information, setting various functions, and controlling functions of the mobile terminal 700. For example, the input unit 740 may include a calling key for requesting a voice call, a video call request key for requesting a video call, a termination key for requesting termination of a voice call or a video call, a volume key for adjusting output volume of an audio signal, a direction key, and the like. In particular, the input unit 740 according to exemplary embodiments of the present invention may transmit to the controller 710 signals related to selection of data to transfer and/or selection of devices to which the data may be transferred. Such an input unit 740 may be formed by one or a combination of input means such as a touch pad, a touch screen, a button-type key pad, a joystick, a wheel key, and the like.

The display unit 730 displays information inputted by the user or information to be provided to the user as well as various menus of the mobile terminal 700. For example, the display unit 730 may provide various screens according to the user of the mobile terminal 700, such as an idle screen, a message writing screen, a calling screen, and the like. In particular, the display unit 730 according to exemplary embodiments of the present invention can display a menu. The menu may include a list of functions relating to the transfer of data across devices. For example, the menu may include a list including a function corresponding to copying data to a device, pasting data from a device, cutting data and pasting such data to a device, and the like. The menu may be displayed to enable a user to select data to be transferred and/or to select a device to which the data may be transferred. For example, the display unit 530 may display an interface which the user may manipulate or otherwise enter inputs via a touch screen to enter selection of the data that may be transferred or selection of devices to which the data may be transferred. The display unit 730 can be formed as a Liquid Crystal Display (LCD), an Organic Light Emitting Diode (OLED), an Active Matrix Organic Light Emitting Diode (AMOLED), and the like. However, the present invention is not limited to these examples. Further, the display unit 730 can perform the function of the input unit 740 if the display unit 730 is formed as a touch screen.

According to exemplary embodiments of the present invention, the mobile terminal comprises at least one controller 710. The at least one controller 710 may be configured to operatively control the mobile terminal 700. For example, the controller 710 may control operation of the various components or units included in the mobile terminal 700. The controller 710 may transmit a signal to the various components included in the mobile terminal 700 and control a signal flow between internal blocks of the mobile terminal 700. In particular, the controller 710 according to exemplary embodiments of the present invention can control selection of data to that may be transferred, selection of at least one device to which the data may be transferred, receipt of an indication of transfer from the device to which the data may be transferred, receipt of confirmation of transfer of the data to the other device, association of data that may be transferred with a device to which the data may be transferred, copy of data to a clipboard for aggregating data that may be transferred, deletion of the data associated with a cutting function after the mobile terminal 700 has confirmed that the pasting of the data to another mobile terminal is complete or abandoned (e.g., either explicitly by a user of the first mobile terminal 700 or the other mobile terminal, or via a timeout), and registration of data to be copied to a clipboard with an identifier associated with a corresponding device to which the data may be transferred. According to exemplary embodiments of the present invention, the controller 710 may be configured to control the transfer of some data such as, for example, metadata, to the recipient mobile terminal before the recipient mobile terminal confirms the transfer of the data. Data that may be transferred before the recipient mobile terminal confirms the transfer of data may include, for example, a file name, a first few words of text, file or data size, the originating device name, and the like. A user of the recipient mobile terminal may view and select which data to proceed with transferring based at least in part on the data transferred before confirmation of the transfer of data. For example, the data transferred before confirmation of the transfer of data may be used to enable a user to make a more informed decision as to which data to paste to the recipient device.

According to exemplary embodiments of the present invention, the mobile terminal may optionally comprise at least one three dimensional motion sensing input device 770. The at least one three dimensional motion sensing input device 770 may be configured to operate in conjunction with the at least one controller 710 in accordance with configurations and methods known in the art, as are otherwise described herein, and which are incorporated herein by reference.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for detecting a three-dimensional gesture, the method comprising:
   performing a calibration of a network having a plurality of interconnected hardware;
   detecting, by at least one three dimensional motion sensing input device on the network, a three-dimensional gesture of a user;
   selecting, based on the detected gesture, application data corresponding to an application being executed, stored, or displayed on a first device in the network to be transmitted to a second device in the network, the application data being independent of the three-dimensional gesture;
   transmitting, within a predefined time period after the three-dimensional gesture, the selected application data to the second device, the transmitting of the selected application data comprising:
      transmitting a first portion of the selected application data prior to receiving a transfer confirmation from the second device, and
      transmitting a second portion of the selected application data when a transfer confirmation is received from the second device; and
   performing at least one of executing or storing the selected application data on the second device,
   wherein the at least one three dimensional motion sensing input device comprises gesture detection hardware and software,
   wherein the three-dimensional gesture of the user is detected at a predefined position relative to and a predefined distance from the first device,
   wherein the three-dimensional gesture of the user is detected at a predefined position relative to and a predefined distance from the second device,
   wherein the three-dimensional gesture comprises a grabbing gesture and a throwing gesture performed by the user, and
   wherein the selection of the application data is identified by the grabbing gesture, and the second device is determined based on a direction of the throwing gesture relative to the second device.

2. The method of claim 1, wherein the at least one three dimensional motion sensing input device is on the network by inclusion in another piece of hardware or is on the network as a stand-alone device.

3. The method of claim 1, wherein the at least one three dimensional motion sensing input device is included in a mobile device.

4. The method of claim 1, wherein the grabbing gesture occurs within a predefined distance from and with an orthogonal orientation to the first device and the throwing gesture occurs within a predefined distance from and with an orthogonal orientation to the second device.

5. The method of claim 1, wherein the grabbing gesture comprises a fist-clenching motion and the throwing gesture comprises a back-hand swinging motion.

6. The method of claim 1, wherein the grabbing gesture comprises a pinching gesture or a tapping gesture and the throwing gesture comprises an overhand gesture.

7. The method of claim 1, wherein the application data comprises an open software application that is displayed by the first device.

8. The method of claim 1, wherein the hardware associated with the first device is a personal computer, a network server or a mobile device and the hardware associated with the second device is a personal computer, a network server or a mobile device.

9. A network system comprising:
a plurality of interconnected hardware;
at least one processor configured to allow a user to calibrate the network system;
a three-dimensional motion sensing input device including gesture detection hardware and software for detecting a three-dimensional gesture;
a selector configured to select, based on a detected gesture, application data corresponding to an application being executed, stored, or displayed on a first device in the network to be transmitted to a second device in the network, the application data being independent of the three-dimensional gesture;
a transmitter configured to transmit the selected application data to the second device, transmitting within a predefined time period after the three-dimensional gesture, the transmitting of the selected application data comprising:
transmitting a first portion of the selected application data prior to receiving a transfer confirmation from the second device, and
transmitting a second portion of the selected application data when a transfer confirmation is received from the second device,
wherein at least one piece of the interconnected hardware performs at least one of executing or storing the selected application data on the second device,
wherein the three-dimensional gesture of the user is detected at a predefined position relative to and a predefined distance from the first device or the second device,
wherein the three-dimensional gesture includes a grabbing gesture and a throwing gesture performed by the user, and
wherein the selection of the application data is identified by the grabbing gesture, and the second device is determined based on a direction of the throwing gesture relative to the second device.

10. The system of claim 9, further comprising:
at least one piece of hardware that incorporates the at least one three dimensional motion sensing input device.

11. The system of claim 9, wherein the at least one three dimensional motion sensing input device is on the network as a stand-alone device.

12. The system of claim 10, wherein the at least one three-dimensional motion sensing input device is incorporated into a mobile device.

13. The system of claim 9, wherein the grabbing gesture detected by the at least one three-dimensional motion sensing input device includes a fist-clenching motion and the throwing gesture comprises a back-hand swinging motion.

14. The system of claim 9, wherein the grabbing gesture detected by the at least one three-dimensional motion sensing input device includes a pinching gesture or a tapping gesture and the throwing gesture comprises an overhand gesture.

15. The system of claim 9, wherein the application data includes an open software application that is displayed by the first device.

16. The system of claim 9, wherein the hardware associated with the first device is a personal computer, a network server or a mobile device and the hardware associated with the second device is a personal computer, a network server or a mobile device.

* * * * *